(12) United States Patent
Rastogi et al.

(10) Patent No.: US 8,200,460 B2
(45) Date of Patent: Jun. 12, 2012

(54) METHOD OF DESIGNING A MULTI-WINDING DEVICE

(75) Inventors: Mukul Rastogi, Monroeville, PA (US); Marc F. Aiello, Oakmont, PA (US); Frank W. Santucci, Jr., Verona, PA (US); Edward Alan Cheesman, Chicora, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 379 days.

(21) Appl. No.: 12/508,525

(22) Filed: Jul. 23, 2009

(65) Prior Publication Data
US 2010/0023896 A1 Jan. 28, 2010

Related U.S. Application Data

(60) Provisional application No. 61/083,212, filed on Jul. 24, 2008.

(51) Int. Cl.
*G06F 17/50* (2006.01)
(52) U.S. Cl. .......... 703/2; 703/17; 703/19; 363/154; 701/99
(58) Field of Classification Search .......... 703/2, 7, 703/17, 19; 701/99; 363/5, 154; 361/93.6
See application file for complete search history.

(56) References Cited

U.S. PATENT DOCUMENTS

| | | | | |
|---|---|---|---|---|
| 3,917,929 A * | 11/1975 | Reinhart | ......... | 701/99 |
| 3,924,074 A * | 12/1975 | Peterson | ......... | 380/35 |
| 5,434,455 A | 7/1995 | Kammeter | | |
| 6,198,647 B1 * | 3/2001 | Zhou et al. | ......... | 363/154 |
| 6,724,597 B1 * | 4/2004 | Elischer et al. | ......... | 361/93.6 |
| 7,382,113 B2 * | 6/2008 | Wai et al. | ......... | 323/222 |
| 7,496,871 B2 * | 2/2009 | Suaya et al. | ......... | 716/136 |
| 7,719,858 B1 * | 5/2010 | Paice | ......... | 363/5 |
| 2007/0216390 A1 * | 9/2007 | Wai et al. | ......... | 323/351 |

FOREIGN PATENT DOCUMENTS
WO WO 2007030833 A2 3/2007
* cited by examiner

*Primary Examiner* — Thai Phan

(57) ABSTRACT

A method for designing a transformer using three secondary winding phase shift angles and a minimized core cross-sections. The method includes receiving an indication of an acceptable level of total harmonic distortion (THD) for the transformer, identifying a desired number of secondary windings per output phase of the transformer, simulating performance of various models for the transformer various potential phase shift angles, wherein each of the various models includes a set of phase shift angles for the secondary windings of the transformer. The method further includes identifying, based on the simulation, a transformer model that both has no more than three unique phase shift angles in the set and exhibits a primary side THD that is within the acceptable level, identifying an optimized core cross-sections, and reporting the identified transformer model having the three unique phase shift angle and the optimized core cross-sections.

14 Claims, 6 Drawing Sheets

METHOD OF DESIGNING A MULTI-WINDING DEVICE

CROSS REFERENCE TO RELATED PATENTS

This application claims the priority benefit of U.S. Provisional Application No. 61/083,212, filed on Jul. 24, 2008.

BACKGROUND

The present application discloses an invention that is related, generally and in various embodiments, to optimizing multi-winding transformer manufacturing. More particularly, the present application relates to the optimization of multi-winding transformer manufacturing as applied to transformers for alternating current (AC) motor drives.

Many AC motor drives utilize a rectifier load as a front-end power and current regulator and delivery mechanism. Rectifiers may typically be characterized by a 6-pulse input current waveform having significant harmonic content. In order to limit the harmonic current flowing into the utility (or supply), some transformers use multiple secondary windings. Several rectifiers are used instead of a single fully rated rectifier, and each rectifier is fed from one of the secondary windings of the transformer. The secondary windings may be phase-shifted to provide a multi-pulsed front end that has reduced harmonic content.

An exemplary AC motor drive having multiple rectifiers is described, for example, in U.S. Pat. No. 5,625,545 to Hammond ("the '545 patent"), the contents of which are hereby fully incorporated by reference. As described in the '545 patent, the AC motor drive includes a multi-phase power transformer which has one or more primary winding circuits and a plurality of secondary winding circuits, and each secondary winding circuit is connected to a different power cell. Each power cell contains a rectifier input that is supplied by a dedicated secondary winding. On the output side of the power cells, DC to AC inverters form a series connection to obtain a required voltage that may be needed for each output phase. A 3-phase AC motor drive would include three times the power cells required for each output phase. In general, the desired output voltage of the AC motor drive determines the number of power cells required. Similarly, the number of power cells required determines the number of secondary windings required. Thus, the overall design of the transformer is dependent on the desired output voltage and output current of the AC motor drive.

FIG. 1 illustrates an exemplary AC motor drive 11 which includes a conventional three-phase transformer 13. The transformer includes a primary winding 15 and a plurality of three-phase secondary windings 17, with each winding having specific output voltages and phase angles. On the output side of AC drive 11, each of the three phases of the AC motor is driven by a string of power cells connected in series. In the AC drive of FIG. 1, there are six power cells per phase, labeled A1 through A6, B1 through B6, and C1 through C6, for a total of 18 power cells. It is appreciated that in other implementations, other numbers of cells per phase are possible (e.g., one cell, three cells, nine cells, etc.). In the context of an AC drive or an AC power supply, each power cell is a device which accepts three-phase AC input power, outputs a single-phase AC voltage, and includes an AC-DC rectifier (which may be regenerative), a smoothing filter, and an output DC-to-AC converter.

In the AC drive of FIG. 1, the transformer 13 receives three-phase AC input power from a source, at the points labeled R, S, and T on its primary winding 15. Each power cell receives three-phase AC input power from a dedicated secondary winding 17 of the transformer 13. The eighteen secondary windings 17 have the same nominal voltage, and are arranged in ranks of three, with each rank having one of six specific nominal phase angles. Each secondary winding 17 is directly connected to a power cell, thereby providing each power cell a rectified input voltage and current as discussed above.

When multiple secondary windings are used to feed the power cells, the harmonic contents of the primary side currents are directly related to the number of secondary windings used. The following table illustrates a well known relationship between the number of secondary windings and the effective pulse number on the primary side.

TABLE 1

| # Secondary Windings per Output Phase | Effective Pulse # on Primary Side | Secondary Winding Phase Shifts | Output Voltage Ratings (V) |
|---|---|---|---|
| 3 | 18 | ±20°, 0° | 4160 |
| 4 | 24 | ±7.5°, ±22.5° | 4800 |
| 5 | 30 | 0°, ±12°, ±24° | 6000 |
| 6 | 36 | ±5°, ±15°, ±25° | 8000 |
| 7 | 42 | 0°, ±4.3°, ±12.9°, ±21.5° | 9300 |
| 8 | 48 | ±3.75°, ±11.25°, ±18.75°, ±26.25° | 10000 |

Typically in transformer design, each 3-phase secondary winding is delta-connected with taps placed at various positions on the windings to obtain a desired phase shift angle. Various delta windings are illustrated in FIG. 2. A 3-phase secondary winding 10 has taps on individual windings 10A, 10B and 10C positioned such that a phase shift angle of −20° is output by the secondary winding 10. A 3-phase secondary winding 20 has taps on individual windings 20A, 20B and 20C positioned such that a phase shift angle of 0° is output by the secondary winding 20. A 3-phase secondary winding 30 has taps on individual windings 30A, 30B and 30C positioned such that a phase shift angle of +20° is output by the secondary winding 30.

As shown in Table 1, the secondary winding phase shift angles are unique for each number of secondary windings, with the exception of the zero degree phase shift. Thus, to support an AC motor drive that can have anywhere from 3 power cells per output phase (for a total of 9 power cells) to 8 power cells per output phase (for a total of 24 power cells), 16 unique winding phase-shift angles are required.

The transformer design for an AC motor drive supporting variable number of power cells is dependent on the desired voltage and current output of the AC motor drive, as well as the various required phase shift angles. For example, an AC motor drive product family could have rated output currents of 70 A, 100 A, 140 A, 200 A and 260 A (or 5 current levels), and have one rated voltage for each secondary winding, such as that shown in Table 1. Thus, the total number of designs that needs to be supported for this product family would be 480 (16 [phase shift angles]×5 [current levels]×6 [voltage levels]). The large number of unique designs require variations in winding thickness, winding phase-shift designs and iron core cross-sections that need to be generated and maintained during transformer production, resulting in much higher manufacturing costs.

SUMMARY

In one general respect, the embodiments disclose a method for designing a series of transformers. The method includes receiving, via an input to a processing device, an indication of an acceptable level of current total harmonic distortion (THD) for a transformer, identifying a desired number of secondary windings per output phase of the transformer, wherein the number is greater than two, simulating, via computer program instructions operating on the processing device, performance of various models for the transformer, wherein each of the various models includes a set of phase shift angles between the secondary windings of the transformer, identifying, based on the simulation, a transformer model that both has no more than three unique phase shift angles in the set and exhibits a primary side current THD that is within the acceptable level, and reporting the identified transformer model.

In another general respect, the embodiments disclose a method for designing a series of transformers for supplying power to a multi-cell motor drive. The method includes receiving, via an input to a processing device, an indication of an acceptable level of current total harmonic distortion (THD) for a transformer, a set of potential first angle values for a first phase shift angle, and a set of potential second angle values for a second phase shift angle, identifying a desired number of secondary windings per output phase of the transformer, wherein the number of secondary windings per phase is equal to a number of cells per phase of the motor drive, simulating, via computer program instructions operating on the processing device, performance of various models for the transformer, wherein each of the various models includes a set of phase shift angles between the secondary windings of the transformer, identifying, based on the simulation, a transformer model that both has no more than three unique phase shift angles in the set and exhibits a primary side current THD that is within the acceptable level, optimizing a core cross-section of the transformer in the transformer model, and reporting the identified transformer model.

In another general respect, the embodiments disclose a multi-phase motor drive. The motor drive includes three sets of cells, wherein each phase corresponds to one set of cells, and an input transformer configured. The input transformer is configured to receive input at a primary winding and deliver output to the cells via secondary windings, wherein each cell corresponds to a unique secondary winding and the transformer exhibits no more than three unique phase shift angles.

BRIEF DESCRIPTION OF THE DRAWINGS

Various embodiments of the invention are described herein by way of example in conjunction with the following figures.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The present application provides multiple processes to reduce the number of design variations used to produce a transformer for an AC motor drive supporting variable number of power cells. The processes may be applied to medium voltage AC motor drive product families, as well as modular power supplies such the power supply described in, for example, in U.S. Pat. No. 5,638,263 to Opal, the contents of which are hereby fully incorporated by reference. Generally, these processes may be applied to the optimization of the design and manufacture of any transformer that utilizes rectifiers to produce an output voltage and current.

This first process may produce an acceptable level of harmonic performance on the primary side of the transformer. Industry standards such as IEEE-519 recommend a worst-case limit of 5.0% on total current distortion at the input of an AC motor drive (or similar device). In order to meet this recommendation, an 18-pulse transformer design having three secondary windings per output phase may be sufficient. However, for all other possible configurations (e.g., 4-8 secondary windings per phase as shown in Table 1), a reduced number of winding angles may be determined and selected. Experimentation has shown that three winding angles may be used, 0°, x° and y°. Table 2 shows the winding angles for different winding configurations:

TABLE 2

| # Secondary Windings per Output Phase | Secondary Winding Phase Shifts |
| --- | --- |
| 3 | 0°, ±x° |
| 4 | 0°, ±x°, +y° |
| 5 | 0°, ±x°, ±y° |
| 6 | 0°, ±x°, 0°, ±x° |
| 7 | 0°, ±x°, 0°, ±x°, +y° |
| 8 | 0°, ±x°, 0°, ±x°, ±y° |

Figure 1:
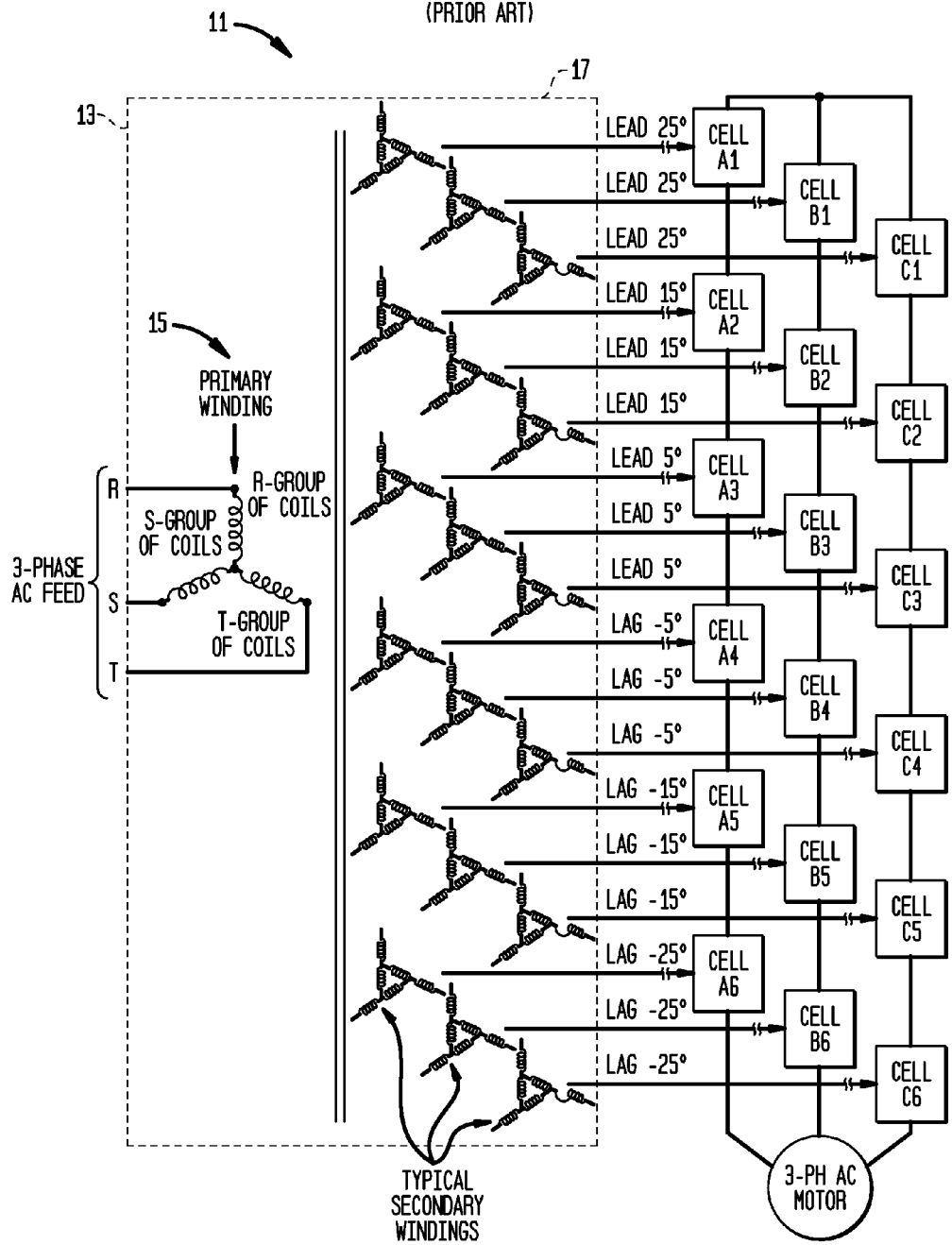
FIG. 1 illustrates an AC drive which includes a conventional three-phase transformer.
Figure 2:
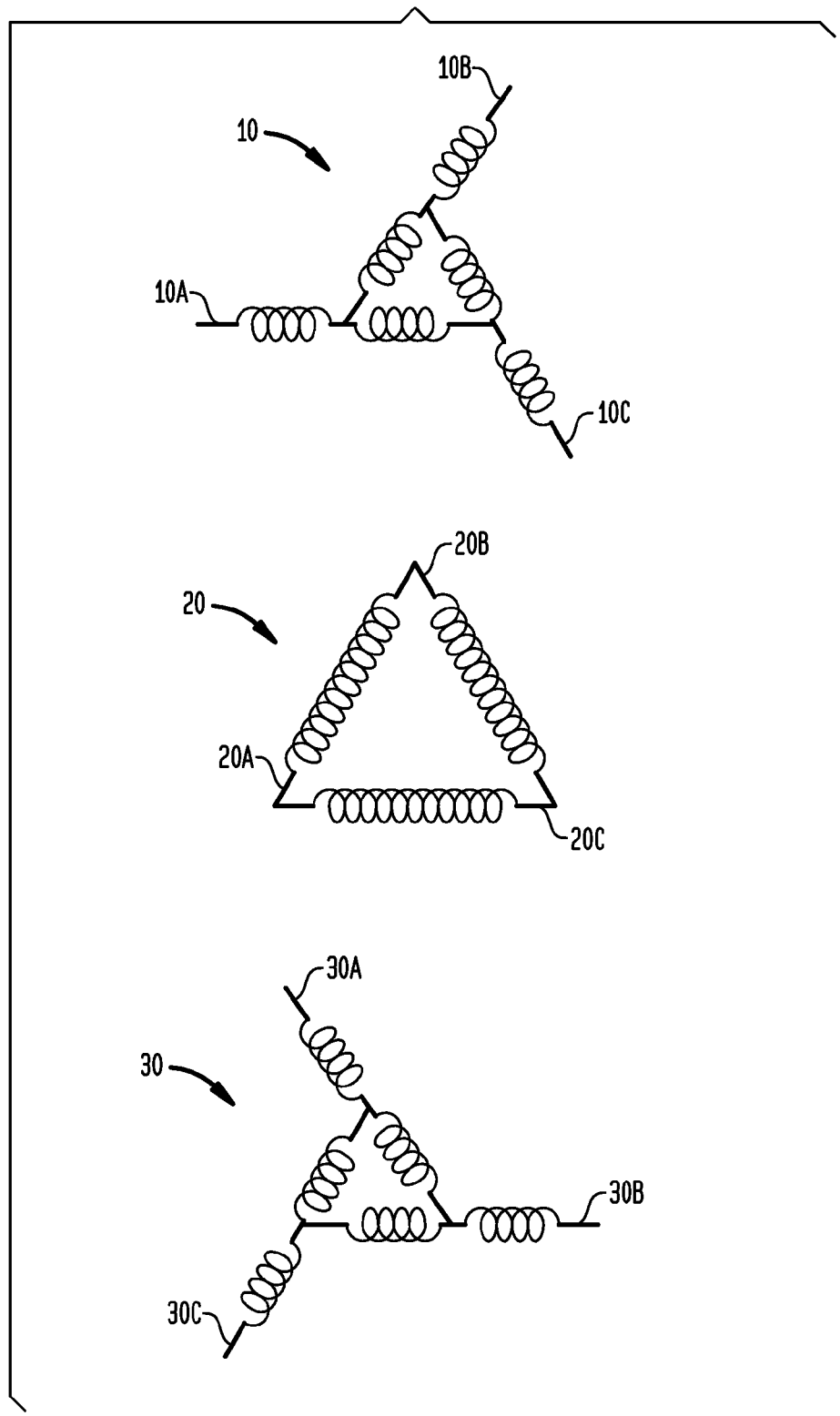
FIG. 2 illustrates several exemplary secondary windings.
Figure 3A:
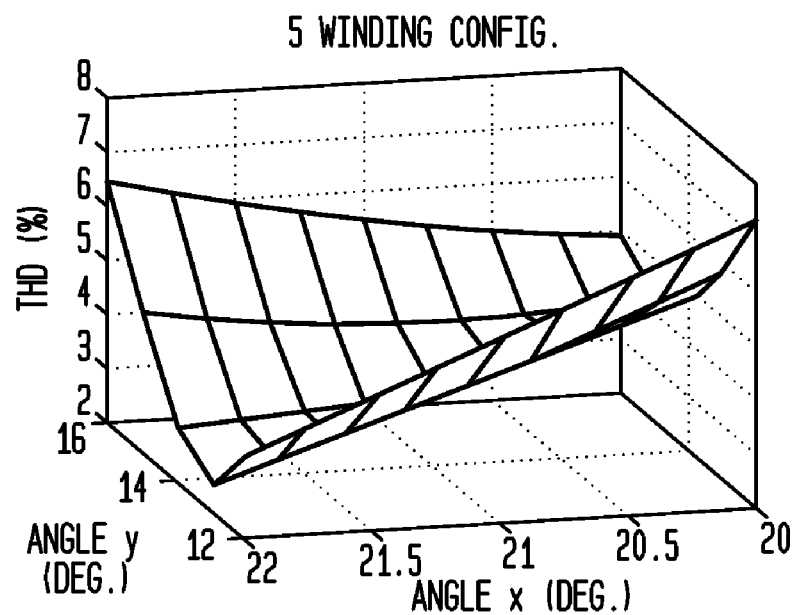
FIG. 3 illustrates various graphs showing testing results of secondary windings for various seconding winding configurations for a transformer.
Figure 3B:
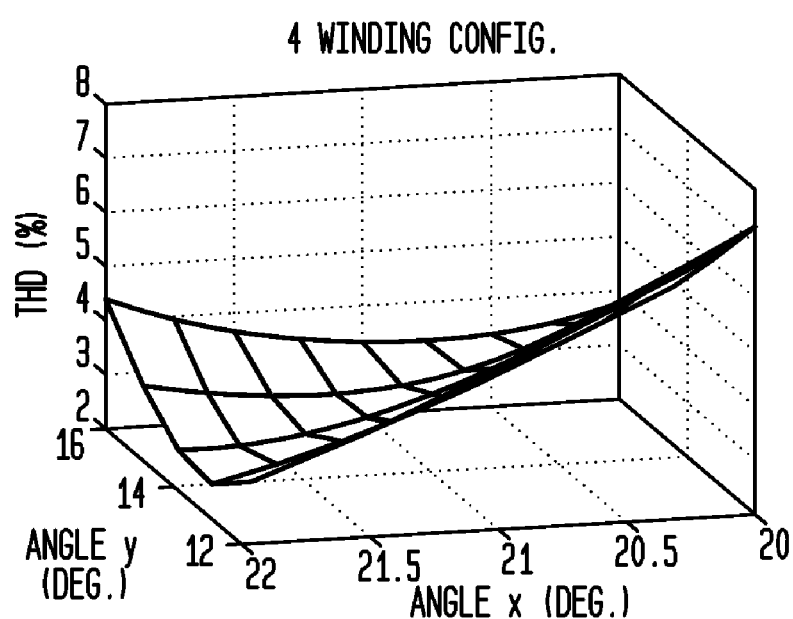
Figure 3C:
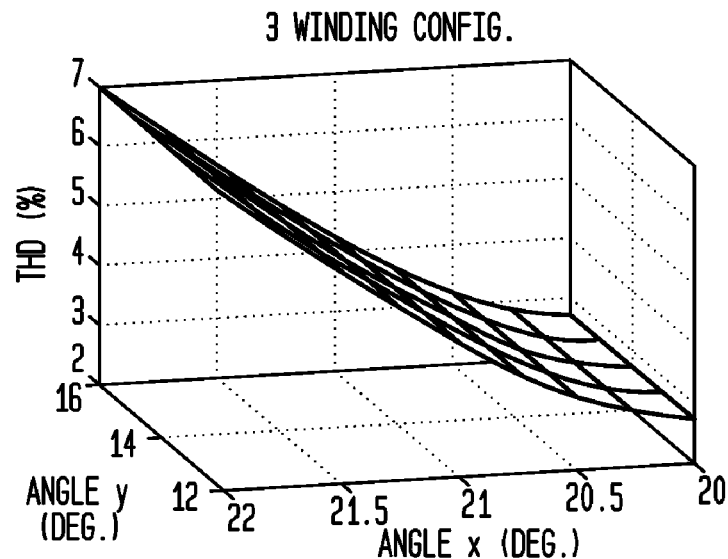
Figure 3D:
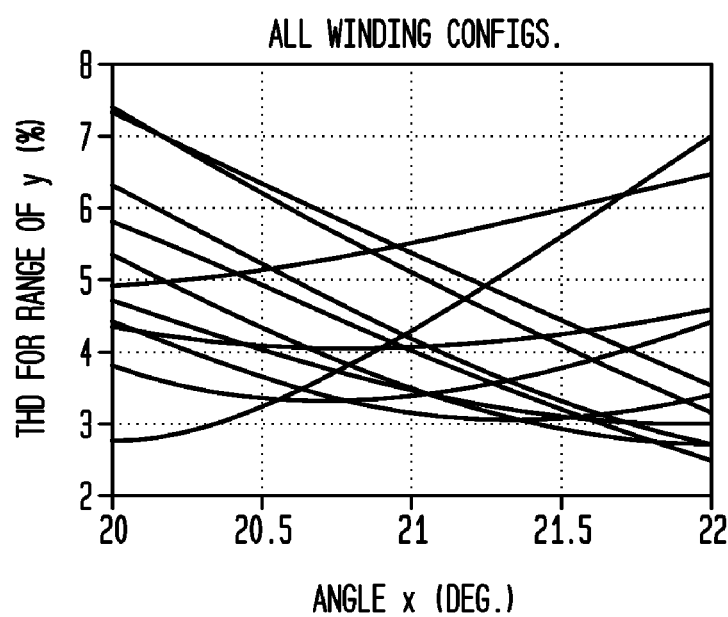

The optimization of the winding angle values for x and y may be based on a 6-pulse rectifier such as those discussed above in reference to FIGS. 1 and 2. This rectifier may produce a 6-pulse waveform having similar harmonics to those illustrated in Table 3:

TABLE 3

| Harmonic # | Amplitude (%) |
|---|---|
| 5 | 49.0 |
| 7 | 22.5 |
| 11 | 9.8 |
| 13 | 7.5 |
| 17 | 2.1 |
| 19 | 1.7 |
| 23 | 1.1 |
| 25 | 1.0 |

The waveform represented by the values in Table 3 may correspond to one potential physical arrangement of secondary windings in the transformer. Other arrangements of the secondary windings may affect any coupling inductance between the secondary windings of the transformer, thereby resulting in different harmonic amplitudes of the rectifier currents.

The effect of different values for x and y on the current total harmonic distortion (THD) for 3, 4 and 5 windings per output phase transformers are shown in graphs A-D of FIG. 3. Graphs A, B and C show three dimensional variations in THD as the value of x is linearly decreased from 22° to 20° and as the value of y is linearly decreased from 16° to 14°. Graph D shows a two dimensional representation of the other three graphs, highlighting the variations in THD as the value of x is changed from 22° to 20°. Based upon further analysis of graphs A-D of FIG. 3, it may be determined that values for x and y that result in acceptable levels of THD for this exemplary transformer configuration is x=20.5° and y=14.5°. By selecting these angles to use as the common phase angles for the secondary windings of the transformer, the same secondary windings may be used in the 3 winding, 4 winding and 5 winding configurations while keeping a relatively low THD (generally around or under 5%). For example, according to Table 2, a 3 winding configuration would have the angles −20.5°, 0°, and +20.5°. A 4 winding configuration would have the angles −20.5°, −14.5°, +14.5° and +20.5°. A 5 winding configuration would have the angles −20.5°, −14.5°, 0°, +14.5° and +20.5°. It should be noted these graphing and analysis techniques may be expanded beyond 3, 4 and 5 winding configurations to the 6, 7 and 8 winding configurations as discussed above. The winding configuration with 6 phase-shift angles uses the same angles as winding configuration 3 two times, e.g., −20.5°, 0°, +20.5°, −20.5°, 0°, and +20.5.

Figure 4:
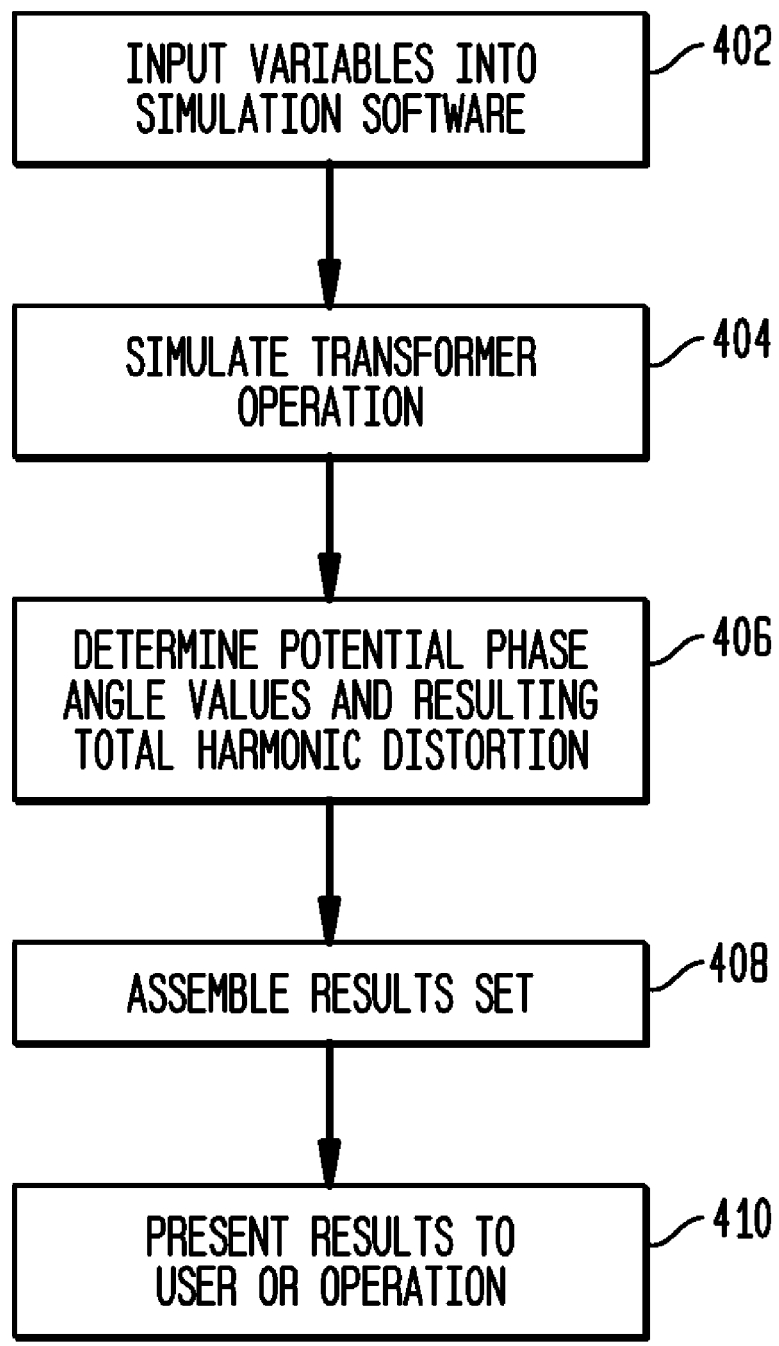
FIG. 4 illustrates various embodiments of a transformer design optimization method.

FIG. 4 shows a flowchart illustrating an exemplary process for optimizing the design of a transformer using the technique discussed above. The process begins when a simulation software module or application is initiated and any variables are input 402 into the software. The variables to be input 402 may be dependent upon the requirements of the transformer, and may include an acceptable level of THD (or an acceptable range of THD, or a maximum THD level), one or more values for angle x, and one or more values for angle y. In one embodiment, the acceptable level of THD may be selected based upon the industry standard set in IEEE-519, e.g., 3%-5%, though other ranges may be used. The acceptable values for angle x and angle y may, in some embodiments, be a range that is selected based upon the range of angles commonly used in secondary winding manufacture. For example, the range selected for angle x may include the larger of the angles used in secondary winding manufacture as shown in Table 1, e.g., 18.75° to 26.25°. Similarly, the range selected for angle y may include the smaller of the angles used in secondary winding manufacture as shown in Table 1, e.g., 5° to 18.75°.

After the variables are input 402 into the simulation software, the simulation software may simulate 404 the function of a transformer having the variables input 402 above. During simulation 404, the simulation software may construct various models showing how a transformer would operate given the various input variables. Based upon these models, the output of the transformer may be determined and analyzed. For example, the software may simulate 404 the performance of a transformer for all angles in the range of values for angle x for each value in the range of values for angle y, repeating this process for all values in the range of values for angle y. The simulation software determines 406 various sets of potential phase angles (e.g., x, y) and the resulting THD associated with each set of potential phase angles.

For each set that is within the acceptable range of THD, the set of potential phase angles is selected and assembled into a results set. The results set may include tables of information listing each set of potential phase angles and the associated THD. The results may also include various graphs such as graphs A-D as shown in FIG. 3. The assembled 408 results may be stored as a file in a computer readable medium for access at a later time, and/or the results may be presented 410 to a user or operator of the simulation software on a computer display or via a printed set of results. As mentioned above, an exemplary results set may be x=20.5° and y=14.5°. Using these angles results in acceptable levels of THD for each of the 3, 4, 5, 6, 7 and 8 secondary windings per output phase transformers. A sample set of results using these optimized angles as compared with conventional angles is shown in Table 4:

TABLE 4

| # Secondary Windings per Output Phase | THD with conventional phase-shift angles (%) | THD with optimized phase-shift angles (%) |
|---|---|---|
| 3 | 2.8 | 3.2 |
| 4 | 1.5 | 3.9 |
| 5 | 1.0 | 3.9 |
| 6 | <1.0 | 3.2 |
| 7 | <1.0 | 2.7 |
| 8 | <1.0 | 2.9 |

After the results are presented 410 to the user or operator, the result may be reviewed and an optimal set of values for angle x and angle y may be selected, and secondary windings conforming to these angles may be assembled. After the secondary windings are assembled, individual transformers may be constructed form the secondary windings conforming to the selected angles. This optimization of design and manufacture reduces the phase angles used in the construction of the secondary windings from 16 unique phase angles to 3 unique phase angles: 0°, x° and y°.

A second approach to optimizing the design and manufacture of transformers may be to standardize a the cross-section of the transformer core. This may be done by placing a restriction that the primary side voltage and output voltage ratings be the same. Such a requirement may be applicable for many applications in which the utility (or supply) voltage is the same as the rated AC motor voltage.

Primary winding voltages typically range from 2,300 V to 13,800 V. However, popular voltage levels in various regions of the world include 4,160 V, 6,000 V and 10,000 V. For such levels an AC motor drive may have 3, 5 and 8 cells per output phase, or the same number of secondary windings per output phase. The transformer core size may be chosen to operate at a design value of flux density, which in turn depends on the volts-per-turn value. Typical design rules for a transformer may establish a volts-per-turn value that is dependent on the required volt-ampere (VA) rating. Thus, every transformer may have a transformer core cross-section that is uniquely dependent on the desired VA rating.

Figure 5:
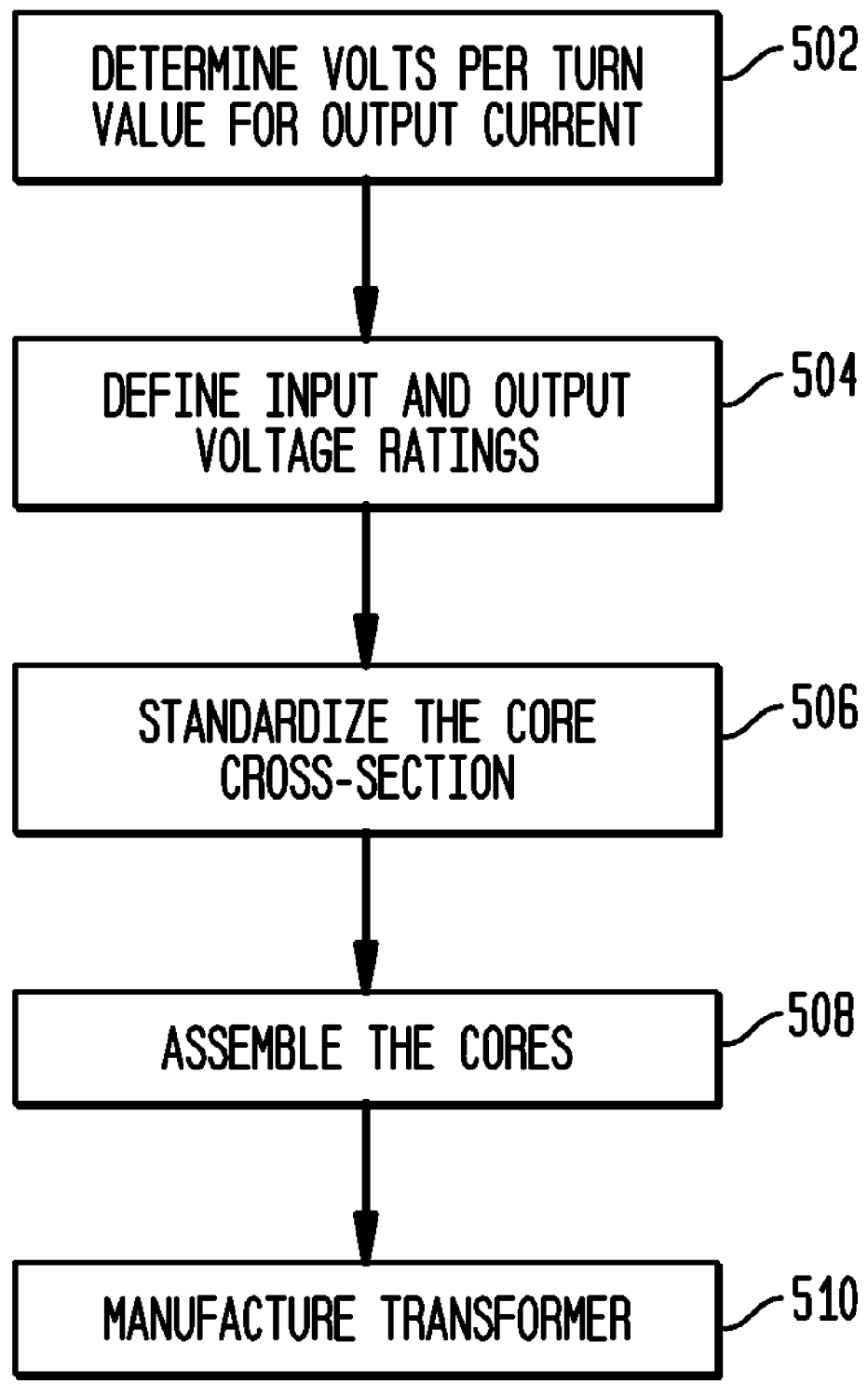
FIG. 5 illustrates various additional embodiments of a transformer design optimization method.

FIG. 5 shows a flowchart illustrating a second exemplary process for optimizing the design of a transformer. To consolidate the number of transformer designs to a smaller set, for a given output current rating (such as 70 A, 100 A, 140 A, 200 A or 260 A), the volts-per-turn value (=VT_sel) may be determined 502. This value may be based on a desired VA rating of the transformer. For example, 6,600 V may be selected as this value fits well between the 4,160 V level for the 3 winding configuration and the 10,000 V level for the 8 winding configuration. This determination may also be determined by a software simulation such as the simulation discussed above in reference to FIG. 4. Variables relating to the operation of the transformer may be input such as the VA rating of the transformer, and a simulation may be run determining 502 the volts-per-turn value for the transformer. The transformer cross-section for 4,160 V, 6,000 V and 10,000 V input and output voltage ratings may then be defined 504 by the selected value of volts-per-turn (=VT_sel). Similarly, to the determination 502 of the volts-per-turn value, this process may be performed via simulation software as well. This simulation software may standardize 506 the core cross-section for a given rating of output current for a pre-specified set of input and output voltages, producing a results set for storing on a computer readable medium and/or for presenting to a user. Once the core cross-section is standardized 506, the user may input this information into a manufacturing process controller or a similar device such that standardized cores may be assembled 508 and the transformers may be manufactured 510 from the standardized cores.

While configurations with 4 and 6 windings per output phase may not result in commercially popular voltage levels, they may be used in applications where a transformer may provide a motor drives with redundant or an additional number of power cells. For example, U.S. Pat. No. 5,986,909 to Hammond, the contents of which are hereby fully incorporated by reference, describes how a series power cell based motor drive may be configured to provide high availability with the addition of redundant cells. For these two configurations, the input/output voltage levels may remain at 4160V (for the 4 winding configuration) and 6000V (for the 6 winding configuration). A similar process of selecting the volts-per-turn may be applied for a given output current rating. In such a case, the volts-per-turn value (=VT_sel) may be based on the VA rating of the transformer with 5100V primary voltage rating (and 5 winding configuration). The transformer cross-section based on the selected value, VT_sel, may be used for the 4 and 6 winding configurations.

The optimization of the core design as discussed above in reference to FIG. 5 may reduce the number of required cores from 5 per current rating to 2 per current rating. This optimization, combined with the optimization of the secondary windings, may result in substantial financial savings as well as space savings in a manufacturing facility as fewer types of individual components need to be manufactured and stored for the various ratings of transformers. Rather, common components may be interchangeably used between the various transformers.

The simulation software modules or applications discussed above in reference to FIGS. 4 and 5 may be implemented on a computing device. The computing device may include a central processing unit (CPU), and computer readable media or storage devices such as read only memory (ROM) and random access memory (RAM).

The computing device may further include a controller for interfacing with one or more optional memory devices. These memory devices may include, for example, an external or internal DVD drive, a CD ROM drive, a hard drive, flash memory, a USB drive or the like. The memory devices may be configured to store the various results discussed above in reference to FIGS. 4 and 5. As indicated previously, these various drives and controllers are optional devices.

Program instructions for performing the simulations discussed in FIGS. 4 and 5 may be stored in the ROM and/or the RAM. Optionally, program instructions may be stored on an additional computer readable medium.

An optional display interface may permit information to be displayed on a display in audio, visual, graphic or alphanumeric format. The display may present the results of the simulation software as discussed above in reference to FIG. 4. Communication with external devices may occur using various communication ports. The computing device may also include an interface which allows for receipt of data from input devices such as a keyboard or other input device such as a mouse, a joystick, a touch screen, a remote control, a pointing device, a video input device and/or an audio input device.

The examples used in the above exemplary processes indicate that the process of consolidation may reduce the number of winding phase-shift angles from 16 to 3 and the transformer core cross-sections from 5 per current rating to 2 per current rating. It should be noted that the consolidation of the secondary winding phase-shift angles and the consolidation of the transformer core cross-sections may both be used in the optimization of the design and manufacture of a transformer, or just one of the consolidations may be used, depending on the application and requirements of the transformer.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A method for designing a series of transformers, comprising:
    receiving, via an input to a processing device, an indication of an acceptable level of total harmonic distortion (THD) for a transformer;
    identifying a desired number of secondary windings per output phase of the transformer, wherein the number is greater than two;
    simulating, via computer program instructions operating on the processing device, performance of various models for the transformer, wherein each of the various models includes a set of phase shift angles between the secondary windings of the transformer;
    identifying, based on the simulation, a transformer model that both has no more than three unique phase shift angles in the set and exhibits a primary side THD that is within the acceptable level; and
    reporting the identified transformer model.

2. The method of claim 1, wherein:
the receiving further comprises receiving:
- a set of potential first angle values for a first phase shift angle, and
- a set of potential second angle values for a second phase shift angle; and the simulating uses the set of potential first angle values and the set of second potential angle values.

3. The method of claim 1, wherein the acceptable level of THD comprises a range of values.

4. The method of claim 1, wherein the series of transformers comprises at least one of a 3 secondary winding transformer, a 4 secondary winding transformer, a 5 secondary winding transformer, a 8 secondary winding transformer, a 7 secondary winding transformer, and an 8 secondary winding transformer.

5. The method of claim 1, wherein the three unique phase shift angles comprise the first angle, the second angle and 0°.

6. The method of claim 5, further comprising using the three unique phase shift angles to assemble the secondary windings for the transformer.

7. The method of claim 1, further comprising optimizing a core cross-section of the transformer.

8. The method of claim 7, wherein the optimizing the core cross-section further comprises determining a common core cross-section for a plurality of transformer output ratings based upon an output current rating of the transformer, an output voltage rating of the transformer, and a volts-per-turn rating of the transformer.

9. A method for designing a series of transformers for supplying power to a multi-cell motor drive, comprising:
receiving, via an input to a processing device, an indication of an acceptable level of total harmonic distortion (THD) for a transformer, a set of potential first angle values for a first phase shift angle, and a set of potential second angle values for a second phase shift angle;
identifying a desired number of secondary windings per output phase of the transformer, wherein the number of secondary windings per phase is equal to a number of cells per phase of the motor drive;
simulating, via computer program instructions operating on the processing device, performance of various models for the transformer, wherein each of the various models includes a set of phase shift angles between the secondary windings of the transformer;
identifying, based on the simulation, a transformer model that both has no more than three unique phase shift angles in the set and exhibits a primary side THD that is within the acceptable level;
optimizing a core cross-section of the transformer in the transformer model; and
reporting the identified transformer model.

10. The method of claim 9, wherein the acceptable level of THD comprises a range of values.

11. The method of claim 9, wherein the series of transformers comprises at least one of a 3 secondary winding transformer, a 4 secondary winding transformer, a 5 secondary winding transformer, a 8 secondary winding transformer, a 7 secondary winding transformer, and an 8 secondary winding transformer.

12. The method of claim 9, wherein the three unique phase shift angles comprise the first angle, the second angle and 0'.

13. The method of claim 2, further comprising using the three unique phase shift angles to assemble the secondary windings for the transformer.

14. The method of claim 9, wherein the optimizing the core cross-section further comprises determining a common core cross-section for a plurality of transformer output ratings based upon an output current rating of the transformer, an output voltage rating of the transformer, and a volts-per-turn rating of the transformer.

* * * * *